United States Patent Office 3,222,602
Patented Dec. 7, 1965

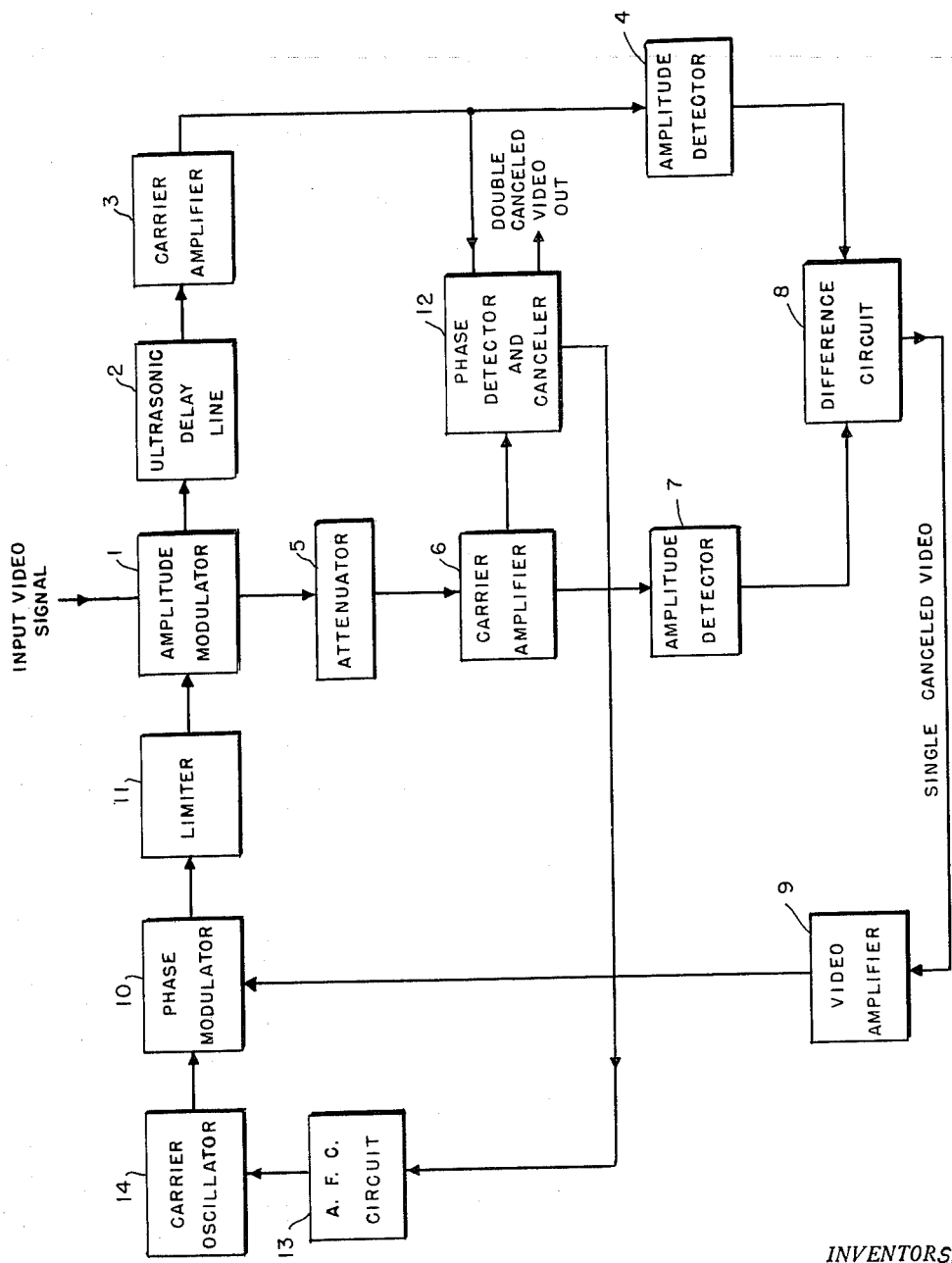

3,222,602
APPARATUS FOR DOUBLE CANCELLATION UTILIZING ONE DELAY LINE IN A MOVING TARGET INDICATING SYSTEM
Charles H. Gager, West Islip, and Abraham E. Ruvin, North Massapequa, N.Y., assignors to the United States of America as represented by the Secretary of the Army
Filed June 12, 1959, Ser. No. 820,061
4 Claims. (Cl. 325—476)

This invention relates to radar systems and more particularly to a method and apparatus for double cancellation of recurrent pulse trains.

Moving target indicator (MTI) systems have utilized canceller circuits since World War II. These cancellers generally use an ultrasonic delay line to delay input radar video signals by exactly one interpulse period of the radar signal. The input signals have the characteristic that the undesirable fixed targets have constant amplitude from one interpulse period to the next, whereas the desired moving target signals have a variable amplitude from one interpulse period to the next due to the Doppler frequency beat between the return target signals and some reference signal in the radar receiver. Conventional canceller circuits modulate the return video signals upon a carrier before passing the signals through the delay line in order to match the bandpass characteristics of the conventionally used ultrasonic delay lines. An amplitude comparison is made of the return signals. Thus, the constant amplitude signals from fixed targets cancel out and only the signals from moving targets give a resultant output signal after comparison.

Another conventional canceller circuit used in MTI radar systems is called the double canceller circuit. This circuit is identical to the conventional canceller circuit except that two identical canceller channels are cascaded.

Our invention is also a double canceller circuit used to distinguish moving targets from fixed targets. The invention differs from conventional canceller circuits in that we use only one delay line. The use of one delay line rather than two overcomes the matching problems encountered in conventional double canceller circuits, and reduces considerably the amount of circuitry required.

Therefore, the objects of this invention are to provide a method and apparatus for utilizing only one delay line in the double cancellation of recurrent pulse trains instead of the two delay lines normally employed, to provide a canceller which requires about half of the components of the systems previously utilized in the prior art, and which delays the two cancellations by exactly the same time interval.

These and other objects of the present invention are attained by amplitude modulating an I-F carrier with radar echo pulses (hereinafter referred to as video signals), passing the amplitude modulated carrier through a delay line and through the direct line, subtracting, after amplitude detecting, the direct from the delayed video signal, and using the difference signal to phase modulate the original I-F carrier, comparing the phase between the direct and the delayed carrier signals in a phase detector, and extracting therefrom a double cancelled video output.

The nature of this invention will be more fully understood from the following detailed description and by reference to the accompanying drawing, the single figure of which is a schematic diagram in block form of a circuit in accordance with this invention.

In the circuit shown, the input video signal is used as the amplitude modulating voltage of an I-F carrier, which could be, for example only, 40 mc. The output of the amplitude modulator 1 is applied to a delayed channel and to a direct channel. The delayed channel comprises an ultrasonic delay line 2, which could be of quartz, for example, a carrier amplifier 3 and an amplitude detector 4. Delay line 2 delays the video signal by one interpulse time. The direct channel comprises an attenuator 5, a carrier amplifier 6 and an amplitude detector 7. The delayed input video signal from amplitude detector 4 and the undelayed input video signal from the amplitude detector 7 are canceled by amplitude comparison in a difference circuit 8. Thus, if the echo pulses applied to amplitude modulator 1 are due to a fixed object the output from difference circuit 8 will be zero because the amplitudes of successive pulses are equal. On the other hand, the output from difference circuit 8 will not be zero when the echo pulses are due to a moving object because the amplitudes of successive moving target echoes are not equal.

The second cancellation is accomplished by phase detection. The phase of the carrier signals in the delayed and direct channel is compared by the phase detector 12. Phase detector 12 has a low frequency output that is applied to carrier oscillator 14 through A.F.C. circuit 13. This low frequency output of detector and canceller 12 is used to lock the carrier oscillator frequency to a multiple of the inverse of the ultrasonic delay period so as to maintain a constant carrier phase on a long term basis from period to period. Thus, when the output of difference circuit 8 is zero, there will be no output from detector 12 on the line labelled double cancelled video out because the phase of the two signals to detector 12 is constant.

When the output from difference circuit 8 is not zero (i.e. when the received echo signals emanate from a moving target), the output of oscillator 14 is phase modulated by the output of difference circuit 8. This phase modulation is accomplished by applying, via amplifier 9, the output of difference circuit 8 to one input of phase modulator 10. The output of oscillator 14 is, of course, applied to the other input of modulator 10. The output of modulator 10 is then applied to limiter 11 to remove any spurious amplitude modulation introduced onto the carrier by phase modulator 10. This eliminates cross-talk between the first and second canceller circuits.

From the foregoing discussion it follows that video signals that have constant amplitude from one interpulse period to the next will produce a phase difference between the delayed and direct carrier amplifier signals into phase detector and canceller 12 which is equal to that from an unmodulated signal. Under these conditions no video output is produced by detector 12 because the detector is sensitive only to the relative phase between signals. However, signals whose amplitude varies from one interpulse period to the next will introduce a variable phase difference between signals into detector 12 and an output signal will then appear on the double cancelled video output line.

The circuits used in the various boxes shown in the drawing are conventional circuits; therefore, no schematic diagram is included with this specification. Furthermore, it is the arrangement of these circuits and not the circuits themselves that constitutes our invention. With this in mind we intend to be limited only by the limitations set forth in the appended claims.

What is claimed is:
1. A double cancellation circuit for a moving-target indicating system comprising: an amplitude modulator having two inputs and two outputs; means to apply recurrent pulses to one of said amplitude modulator inputs; means to apply a carrier signal to the other of said amplitude modulator inputs; a delay line having a delay time equivalent to the interpulse period of said recurrent pulses coupled to one of said amplitude modulator outputs; an attenuator coupled to the other of said amplitude modulator outputs; a first amplitude detector coupled to the output of said delay line; a second detector coupled to the output of said attenuator; a difference circuit coupled to said first and second detectors; a phase modulator; means to apply the output of said difference circuit to said phase modulator; means to apply said carrier signal to said phase modulator a phase detector; means to apply the output of said phase modulator to said phase detector; and means to apply the output of said delay line to said phase detector.

2. A double cancellation circuit for a moving target indicating system comprising: a carrier oscillator; a phase modulator connected to said oscillator; a limiter connected to said phase modulator; an amplitude modulator connected to said limiter; an ultrasonic delay line connected to said amplitude modulator; a first carrier amplifier connected to said delay line; a first amplitude detector connected to said carrier amplifier; an attenuator connected to said amplitude modulator; a second carrier amplifier conected to said attenuator; a second amplitude detector connected to said second carrier amplifier; a difference circuit connected to said first and second amplitude detectors; a video amplifier connected between said difference circuit and said phase modulator; a phase detector connected to said second carrier amplifier; and an A.F.C. circuit connected between said carrier oscillator and said phase detector.

3. A double cancellation circuit for a moving target indicating system comprising: means to amplitude-modulate recurrent pulses upon a carrier; means coupled to said amplitude-modulating means to delay said modulated carrier by one interpulse period of said recurrent pulse; means coupled to said delay means and to said amplitude-modulating means for detecting the amplitude difference between successive pulses of said recurrent pulses; means coupled to said difference detecting means for phase modulating said carrier with the output from said difference detecting means; means to couple the output of said phase-modulating means to said delay means; and means coupled to said delay means and to said phase-modulating means for detecting the phase difference between said recurrent pulses.

4. A double cancellation circuit for moving-target indicating systems comprising: a carrier oscillator; means coupled to said carrier oscillator for amplitude-modulating the output of said carrier oscillator with recurrent pulses; means coupled to said amplitude-modulating means for detecting the amplitude difference between successive pulses of said recurrent pulses; means coupled to said amplitude difference detecting means for phase modulating the output of said carrier oscillator with the output of said difference detector; and means coupled to said phase-modulating means for detecting the phase difference of successive pulses of said recurrent pulses.

References Cited by the Examiner
UNITED STATES PATENTS
2,901,745  8/1959  Kuhn _____ 343—7.7

ROY LAKE, *Primary Examiner.*

CHESTER L. JUSTUS, FREDERICK M. STRADER,
*Examiners.*